Aug. 18, 1959     G. S. ANDERSON     2,900,209
FLUID PRESSURE BRAKE APPARATUS WITH EQUALIZING RESERVOIR
PRESSURE BUILD-BACK PREVENTING MEANS
Filed Feb. 27, 1956
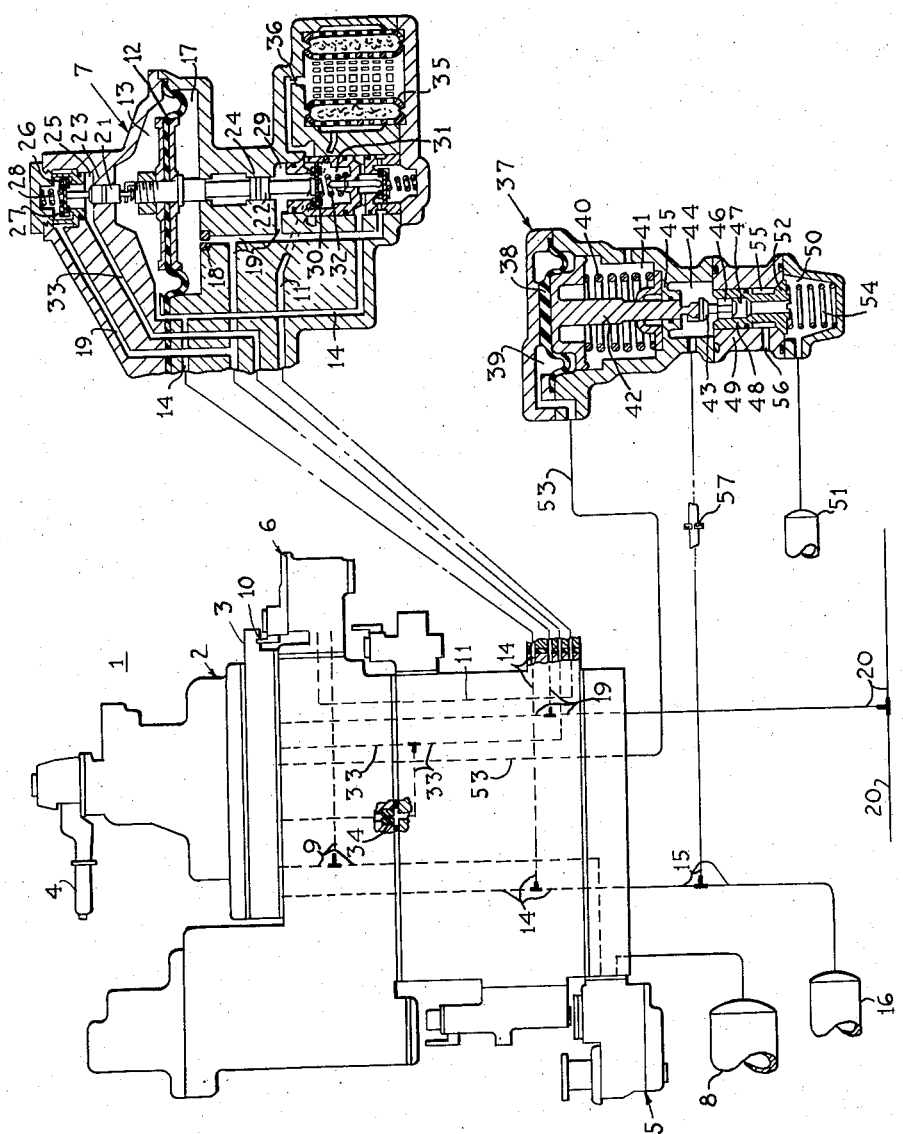
INVENTOR.
George S. Anderson
BY
ATTORNEY

United States Patent Office 2,900,209
Patented Aug. 18, 1959

2,900,209

FLUID PRESSURE BRAKE APPARATUS WITH EQUALIZING RESERVOIR PRESSURE BUILD-BACK PREVENTING MEANS

George S. Anderson, Turtle Creek, Pa., assignor to Westinghouse Air Brake Company, Wilmerding, Pa., a corporation of Pennsylvania Application February 27, 1956, Serial No. 568,125

9 Claims. (Cl. 303—67)

This invention relates to locomotive fluid pressure brake apparatus, and more particularly to such apparatus embodying means for nullifying the effect of an undesirable partial build-back or increase in fluid pressure in an equalizing reservoir due to belated absorption of heat through the wall of said reservoir following an operator-effected reduction in such pressure for initiating a brake application.

In the copending application of Harry C. May, U.S. Serial No. 509,198, filed May 18, 1955, and assigned to the assignee of the present invention, there is shown and described a locomotive brake apparatus that comprises a No. DS-24-M engineer's automatic brake valve device operable successively to a service position for effecting a service rate of reduction in equalizing reservoir pressure of a selectable degree, and then to a lap position for bottling up fluid in the equalizing reservoir at the desired reduced pressure. This brake valve device comprises an equalizing valve device that has a movable abutment which responds to this reduction in equalizing reservoir pressure to operatively unseat a brake pipe discharge valve for effecting a corresponding reduction in fluid pressure in a brake pipe for causing brakes to be controlled according to the degree of such brake pipe reduction, in the usual manner. As equalizing reservoir pressure is thus reduced, the temperature of fluid in the equalizing reservoir will be reduced a generally proportionate extent below the temperature of the ambient air surrounding the reservoir wall, and the temperature and hence the pressure of fluid in the equalizing reservoir will build back or increase due to the effect of the heat belatedly absorbed from the ambient air through the reservoir wall.

If the brake apparatus is conditioned to provide flat maintaining, any build-back in equalizing reservoir pressure in excess of about 1 p.s.i. following closure of the brake pipe discharge valve will cause the equalizing valve movable abutment to operatively unseat a maintaining valve and thereby cause an increase in brake pipe pressure in the same manner as if brake pipe pressure had been reduced below equalizing reservoir pressure due to brake pipe leakage. Since the brake controlling valves in current use in the United States are of the direct release type, subject to opposing fluid pressures in the brake pipe and auxiliary reservoir, an increase in brake pipe pressure of about 1 to 1½ p.s.i. above the then lapped auxiliary reservoir pressure will be sufficient to cause the brake controlling valves on the locomotive and all cars to shift to release position and thereby effect a direct and complete release of brakes throughout the train which is of course undesirable.

With an apparatus of the above type, it is therefore necessary to momentarily actuate the brake valve device from lap to service position then back to lap position, in several successive operations, to bleed off the excess equalizing reservoir pressure in order to prevent this undesirable release of brakes.

The principal object of this invention is to provide an improved brake apparatus embodying novel means for automatically nullifying the effect of the build-back in equalizing reservoir pressure caused by the absorption of heat from the ambient air surrounding the reservoir following closure of the brake pipe discharge valve.

Another object is to provide an improved brake apparatus embodying novel means for automatically dissipating, or nullifying the effect of, the above-described build-back in equalizing reservoir pressure so that the engineer will not have to actuate the brake valve device successively from lap position to service position to bleed off the excess equalizing reservoir pressure.

According to the foregoing objects, the improved brake apparatus embodies valve means which responds to charging of a control chamber with fluid under pressure withdrawn from the brake pipe via the brake pipe discharge valve to vent a small volume and responds to closure of said discharge valve and consequent blowdown of pressure from said control chamber via a restriction to connect said vented small volume to said equalizing reservoir via a choke for thereby absorbing or dissipating at a restricted rate any build-back in equalizing reservoir pressure which may thereupon occur.

Other objects and advantages will become apparent from the following more detailed description of the invention and from the accompanying drawing, wherein the single figure is a diagrammatic view of an improved brake apparatus embodying the invention.

Description

Since the invention may, for sake of illustration, be associated with a fluid pressure brake apparatus of the type disclosed in the aforementioned copending application, the disclosure in the accompanying drawing and in the following description is limited to such structural and operational characteristics as are essential to a clear understanding of the present invention.

As shown in the drawing, this brake apparatus comprises an engineer's automatic brake valve device 1 comprising a rotary valve 2 (not shown in detail) contained in a sectionalized casing 3 and operable by arcuate movement of a handle 4 to various positions (hereinafter to be described) for controlling various fluid pressure communications. Contained in the casing 3 are a feed valve device 5, a brake pipe flat maintaining cut-out valve device 6, and an equalizing valve device 7.

As more fully described in the aforementioned copending application, the feed valve device 5 is supplied with fluid under pressure from a main reservoir 8 on the locomotive and operates to provide in a passage 9 in the casing 3 fluid at a desired lesser pressure corresponding to the normal full-charge value of brake pipe pressure. The brake pipe flat maintaining cut-out valve device 6 comprises valve means (not shown) operable responsively to movement of a handle 10 to a maintaining position to connect a branch of passage 9 to a passage 11 for cutting in the brake pipe flat maintaining feature, and operable responsively to movement of said handle to a cut-out position to disestablish such connection for cutting out the brake pipe flat maintaining feature.

The equalizing valve device 7 comprises a movable abutment 12 subject at one side to pressure of fluid in a chamber 13 that is constantly open by way of a passage 14 and a pipe 15 to an equalizing reservoir 16; said movable abutment being subject at the opposite side to pressure of fluid in a chamber 17 that is constantly open by way of a baffle choke 18 and a passage 19 to a branch of a brake pipe 20 that extends from the locomotive and from car to car through the train. Coaxially attached to opposite sides of the movable abutment 12 are cylindrical stems 21, 22, having sealing, slidably guided engagement with the respective walls of aligned bores through casing partitions 23, 24, respectively. Casing partition 23 separates chamber 13 from a chamber 25 at one side of a preferably disc-shaped brake pipe discharge valve 26 that is contained in a chamber 27 and is biased by a helical spring 28 in the latter chamber to a seated position for normally preventing fluid pressure communication between the chambers 25 and 27. Casing partition 24 separates chamber 17 from a chamber 29 at one side of a preferably disc-shaped maintaining valve 30 that is contained in a chamber 31 and is biased to a seated position by a helical spring 32 in the latter chamber for normally preventing fluid pressure communication between the chambers 29 and 31.

In operation, to initially charge this brake apparatus the brake valve handle 4 is moved to a running position, in which fluid under pressure is supplied via a branch of passage 9 and the rotary valve 2 to respective branches of the brake pipe passage 19 and equalizing reservoir passage 15 for charging the brake pipe 20 and equalizing reservoir 16 to the normal full charge value of brake pipe pressure. With the apparatus charged, equalizing reservoir pressure in chamber 13 and brake pipe pressure in chamber 17 of equalizing valve device 7 will be equal, and hence the movable abutment 12 will be biased by the springs 28 and 32 to an intermediate or lap position, in which it is shown, and in which said springs seat the respective valves 26 and 30.

To effect a service application of brakes, the brake valve handle 4 is moved from running position to a service position (or initially to a first service position and then, after a short interval, to service position), for causing fluid under pressure to be released from the equalizing reservoir 16 via passage 15, the rotary valve 2, and a restricted communication (not shown) leading to atmosphere, such that pressure of fluid in the equalizing reservoir and hence in chamber 13 of equalizing valve device 7 will be reduced at a service rate and to a chosen degree corresponding to the degree of brake application desired; whereupon said handle is moved to a lap position for bottling up fluid in the equalizing reservoir at the desired reduced pressure.

Meanwhile, as equalizing reservoir pressure in chamber 13 is thus reduced, brake pipe pressure in chamber 17 will shift the movable abutment 12 and operatively unseat the brake pipe discharge valve 26 against resistance of the bias spring 28. Upon unseating of the valve 26, fluid under pressure will be released from the brake pipe 20 to atmosphere by flow via a branch of passage 19, chamber 27, past the unseated valve 26, to chamber 25, and thence to atmosphere via a release communication including a passage 33, the usual service choke 34 and rotary valve 2 until brake pipe pressure has been reduced to substantially the value of equalizing reservoir pressure; whereupon the movable abutment 12 will be returned to its lap position by spring 28, which spring will also reseat the brake pipe discharge valve 26 for terminating the release of brake pipe pressure. The release communication just defined is opened by the rotary valve 2 when the brake valve handle 4 is in first service and lap positions; and said communication is closed by the rotary valve 2 when said handle is in running position.

Assume now, that with the apparatus as thus far described, the brake pipe flat maintaining cut-out valve handle 10 is in maintaining position and that, following closure of the brake pipe discharge valve 26, the temperature and hence the pressure of fluid in the equalizing reservoir increases due to the belated absorption of heat from the ambient air surrounding the reservoir. Assume further that equalizing reservoir pressure is thus increased to an extent where it exceeds brake pipe pressure by a selected degree, such as about 1 to 1¼ p.s.i., as determined by the value of spring 32.

Under these assumed conditions, the movable abutment 12 will be shifted for operatively unseating the maintaining valve 30 against resistance of spring 32. With valve 32 unseated, fluid under pressure will flow from the then charged passage 11 through a curled hair strainer 35 and a maintaining limiting choke 36 to chamber 31, and thence past the unseated valve 30 and via chamber 29 and a branch of brake pipe passage 19 to the brake pipe 20 for increasing brake pipe pressure until it is restored substantially to equality with equalizing reservoir pressure, in the same manner as if—without any such build-back—brake pipe pressure had reduced below equalizing reservoir pressure due to brake pipe leakage.

If this build-back in equalizing reservoir pressure occurring after closure of the brake pipe discharge valve 26 is sufficient to cause the maintaining valve 30 to be unseated and increase brake pipe pressure about 1 to 1½ p.s.i. above the then lapped auxiliary reservoir pressure, as noted in the various brake controlling valves on the connected cars, then the latter valves will operate to effect a direct and complete release of brakes from the rear toward the front of the train, as previously described.

According to the invention, a relay valve device 37 is provided and arranged for automatically absorbing the build-back in equalizing reservoir pressure which occurs after closure of the brake pipe discharge valve 26, so as to thereby prevent the above-described undesirable complete release of brakes throughout the train.

This relay valve device 37 comprises a movable abutment 38 mounted in a sectionalized casing and subject at one side to pressure of fluid in a control chamber 39 and at the opposite side to pressure of a bias spring 40 in an atmospheric chamber 41. The movable abutment 38 is operatively connected through the medium of a stem 42 to a coaxially arranged tapered supply valve 43 contained in a chamber 44; said stem intermediate its ends having sealing, slidably guided engagement with the wall of an aligned bore through a casing partition 45 separating the chamber 44 from the chamber 41. The supply valve 43 has a preferably integrally formed fluted stem 46 that is slidable within a central opening 47 through an annular plunger 48 that is slidably mounted in a bore through a casing partition 49 separating the chamber 44 from a chamber 50 that is constantly open to a small volume reservoir 51. The supply valve 43 is adapted to seat against a tapered annular valve seat, formed in the adjacent end of the plunger 48 in encirclement of opening 47, for disestablishing flow between the chambers 50 and 44 via said opening. Formed integrally with the opposite end of plunger 48 is a tapered exhaust valve 52 that is adapted to seat against a tapered valve seat formed in the partition 49 in encirclement of the plunger bore.

If the relay valve device 37 is used with the brake valve device 1, which as above stated is of the DS-24-M type described in the aforementioned application, the rotary valve 2 will, when the brake valve handle 4 is in service position and lap position, connect a branch of passage 33 that by-passes choke 34 (and is known commercially in the railway brake field as the "No. 15" line of the DS-24-M Brake Valve) to a passage and pipe 53 of the brake valve device 1 (and is known commercially as the "No. 17" line of the DS-24-M Brake Valve); and it is therefore desirable to utilize this connection so that the existing DS-24-M Brake Valve may be employed without modification. However, if preferred, a branch of the passage 33 may be connected directly to the pipe 53 in by-pass of the rotary valve 2, without in any way changing the function of the improved apparatus.

Thus, irrespective of whether the passage 33 is connected directly to the pipe 53 or is connected to the pipe 53 via the rotary valve 2 and passage 53, fluid under pressure will be released from the brake pipe 20 to the passage 33 and pipe 53, when the brake pipe discharge valve 26 is unseated, in the above-described manner, in consequence of the movement of the brake valve handle 4 to service position for initiating a service application of brakes. Some of the brake pipe fluid thus released past the unseated brake pipe discharge valve 26 to the passage 33 will flow to atmosphere via and at the rate controlled by, the choke 34 as already described; and some of such fluid will also flow to the pipe 53, which leads to the control chamber 39 of relay valve device 37.

The back pressure thus built up against the choke 34 and noted in chamber 39 will shift the movable abutment 38 against the light resistance of spring 40 for successively causing the supply valve 43 to seat against the plunger 48 and then, through such seating engagement, to shift said plunger and thereby unseat the exhaust valve 52 against resistance of a light bias spring 54 that is contained in chamber 50 and normally biases said exhaust valve to a seated position. Under this condition, the chamber 44 will be sealed off from the chamber 50 by the seated supply valve 43; but the latter chamber and hence the reservoir 51 will be opened to atmosphere via the unseated exhaust valve 52, an elongated annular groove 55 formed in the plunger 48 adjacent valve 52, and a vent port 56 through the casing.

It will thus be noted that, while the brake valve handle 4 is in service position and even after the said handle is moved to lap position, the reservoir 51 will be maintained open to atmosphere so long as the brake pipe discharge valve 26 is unseated. As soon as brake pipe pressure is reduced to substantially the chosen reduced value of equalizing reservoir pressure, the movable abutment 12 of equalizing valve device 7 will be shifted to its lap position and the spring 28 will seat the brake pipe discharge valve 26; whereupon fluid pressure in the passage 33 and in the control chamber 39 of relay valve device 37 will blow down to atmosphere via and at the rate controlled by choke 34. As pressure is thus reduced in chamber 39, the spring 40 will shift the movable abutment 38 of device 37 for retracting the stem 42 and thereby successively causing the exhaust valve 52 to be seated by spring 54 and then causing the supply valve 43 to be held off its seat by said stem. Under this condition, the vented volume 51 will be opened via the unseated supply valve 43 to the chamber 44, which chamber is constantly connected to a branch of equalizing reservoir pipe 15 by way of a restricted, preferably felt-protected choke 57.

According to a feature of the invention, the volume reservoir 51 is of such capacity as to nullify the effect of an increase in equalizing reservoir pressure of a predetermined degree, such as about 1 to 2 p.s.i., by increasing the effective volume of the equalizing reservoir 16. The choke 57 is of such flow capacity as to approximate the rate at which equalizing reservoir pressure increases due to the increase in temperature of equalizing reservoir fluid that occurs following closure of the brake pipe discharge valve 26 and is caused by belated absorption of heat from the ambient air surrounding the reservoir. By thus restricting the rate at which equalizing reservoir fluid flows into the volume 51, the choke 57 desirably prevents a sudden reduction in equalizing reservoir pressure of the aforementioned predetermined degree and which sudden reduction might be sufficient to unseat the brake pipe discharge valve 26. Also, by preventing a sudden reduction in equalizing reservoir pressure, the choke 57 assures that if brake pipe pressure should reduce, due to brake pipe leakage, at a faster rate than equalizing reservoir pressure builds back due to the above-described increase in temperature of equalizing reservoir fluid, the brake pipe maintaining valve 30 will be unseated before equalizing reservoir pressure reduces appreciably, if at all. In other words, if no choke 57 is provided, the pressure of fluid in the equalizing reservoir would be promptly reduced as soon as the relay valve device 37 operated to connect the vented volume reservoir 51 to the equalizing reservoir 16; and hence brake pipe pressure would have to reduce, such as due to brake pipe leakage, to a degree sufficiently below the thus reduced value of equalizing reservoir pressure to cause the movable abutment 12 to operatively unseat the maintaining valve 30 against resistance of the spring 32. On the other hand, by employing the choke 57, equalizing reservoir pressure—if it reduces at all—will reduce a negligible amount because, as above stated, said choke limits the flow rate from the reservoir 16 to the reservoir 51 to approximately the rate at which equalizing reservoir pressure builds back due to temperature change; and therefore, in event of brake pipe leakage, unseating of the brake pipe maintaining valve will not be undesirably deferred.

*Summary*

It will now be seen that the improved brake apparatus embodies a relay valve device 37 which operates responsively to charging of a control chamber 39 with fluid under pressure withdrawn from the brake pipe 20 via the brake pipe discharge valve 26, to vent a small volume reservoir 51; said device 37 responding to closure of said discharge valve and consequent blowdown of pressure from said control chamber via an atmospheric communication, including the choke 34, to connect the then vented reservoir 51 to the equalizing reservoir 16 via a small choke 57.

The reservoir 51 is of such capacity as to nullify the effect of an increase in equalizing reservoir pressure of a predetermined degree, such as about 1 to 2 p.s.i., by increasing the effective volume of the equalizing reservoir 16. The choke 57 is provided to so restrict the rate at which fluid pressure is released from the equalizing reservoir 16 into the reservoir 51 as to approximate the rate at which equalizing reservoir pressure builds back due to the increase in temperature of equalizing reservoir fluid that is caused by belated absorption of heat from the ambient air surrounding the reservoir 16 and occurs following closure of the brake pipe discharge valve 26; and said choke therefore prevents a sudden reduction in equalizing reservoir pressure which might cause undesired opening of the brake pipe discharge valve, and also assures that opening of the maintaining valve 30 will not be undesirably deferred in event of a brake pipe leakage condition.

Having now described the invention, what I claim as new and desire to secure by Letters Patent, is:

1. In a fluid pressure brake apparatus, the combination of a brake pipe, an equalizing reservoir, a volume of substantially smaller capacity than said reservoir, operator-controlled brake valve means for effecting a reduction in equalizing reservoir pressure at a service rate and of a chosen degree and then bottling up fluid in the equalizing reservoir following such chosen degree of reduction, brake pipe discharge valve means opened responsively to a reduction in equalizing reservoir pressure below brake pipe pressure for releasing fluid under pressure from said brake pipe at a restricted rate and closed when brake pipe pressure has been reduced to substantially the value of equalizing reservoir pressure, and means conditioned in response to opening of said brake pipe discharge valve means to effect venting of said volume and conditioned in response to closure of said brake pipe discharge valve means to establish a restricted flow connection between said equalizing reservoir and volume, whereby equalizing reservoir pressure will be dissipated at a restricted rate corresponding to the flow capacity of said flow connection and to an extent corresponding to the capacity of said volume.

2. In a fluid pressure brake apparatus, the combination of a brake pipe, an equalizing reservoir, an operator-controlled brake valve device for effecting a reduction in equalizing reservoir pressure of a chosen degree and then bottling up fluid in the equalizing reservoir following such chosen degree of reduction, a volume of substantially smaller capacity than said reservoir, means movable to one position when equalizing reservoir pressure is reduced below brake pipe pressure for supplying fluid under pressure to a control chamber and to another position when brake pipe pressure is substantially equal to equalizing reservoir pressure for terminating such supply, a restricted release communication via which pressure of fluid in said control chamber may blow down at a restricted rate, and means responsive to pressure of fluid in said control chamber to effect venting of said volume and responsive to venting of said control chamber via said restricted communication following movement of the first-mentioned means to its other position to cause a restricted flow connection to be established between said reservoir and the then vented volume, whereby equalizing reservoir pressure will be dissipated at the rate determined by the selected capacity of said restricted flow connection and to an extent corresponding to the selected capacity of said volume.

3. The combination according to claim 2, including normally closed maintaining means opened whenever and so long as equalizing reservoir pressure exceeds brake pipe pressure by at least a predetermined amount for supplying fluid under pressure to the brake pipe, and wherein the selected capacity of said restricted flow connection is such as to dissipate equalizing reservoir pressure at approximately the rate at which equalizing reservoir pressure will tend to build back due to temperature change of equalizing reservoir fluid caused by belated absorption of heat from the ambient air following movement of said first-mentioned means to its other position, so as to thereby so nullify the effect of such build-back as to prevent opening of said maintaining means unless brake pipe pressure is reduced at least said predetermined amount below equalizing reservoir pressure in consequence of a brake pipe leakage condition.

4. In a fluid pressure brake apparatus, the combination of a brake pipe, an equalizing reservoir, operator-controlled brake valve means for effecting a reduction in equalizing reservoir pressure of a chosen degree and then bottling up fluid in the equalizing reservoir following such chosen degree of reduction, a volume of substantially smaller capacity than said reservoir, means defining a fluid pressure communication containing a restriction through which fluid under pressure may be released from said brake pipe at a restricted rate for causing a reduction in brake pipe pressure, brake pipe discharge valve means opened responsively to a reduction in equalizing reservoir pressure below brake pipe pressure to effect connection of said brake pipe with said communication and closed when brake pipe pressure has been reduced to substantially the value of equalizing reservoir pressure, and means responsive to the pressure of fluid developed in said communication at the high pressure side of said restriction while said brake pipe discharge valve means is open to cause said volume to be opened to atmosphere and responsive to venting of said high pressure side of said communication via said restriction following closure of said brake pipe discharge valve means to cause said volume to be closed off from atmosphere and also cause a restricted connection to be established between said equalizing reservoir and then vented volume.

5. The combination according to claim 4, wherein said volume is of such capacity as to nullify the effect of an overall build-back in equalizing reservoir pressure of a predetermined small degree corresponding substantially to that degree of build-back caused by the increase in equalizing reservoir temperature due to belated absorption of heat from the ambient air surrounding the equalizing reservoir following closure of said brake pipe discharge valve means and resultant from the reduction in equalizing reservoir temperature below ambient air temperature caused by the reduction in equalizing reservoir pressure.

6. The combination according to claim 4, wherein the restricted connection established between said equalizing reservoir and then vented volume so restricts the rate of flow of equalizing reservoir fluid into said volume as to substantially approximate the rate at which equalizing reservoir pressure builds back due to increase in temperature of equalizing reservoir fluid caused by belated absorption of heat from the ambient air following closure of the brake pipe discharge valve means.

7. In a fluid pressure brake apparatus, the combination of a brake pipe, an equalizing reservoir, operator-controlled brake valve means for effecting a reduction in equalizing reservoir pressure of a chosen degree and then bottling up fluid in the equalizing reservoir following such chosen degree of reduction, a volume of substantially smaller capacity than said reservoir, means defining a passageway leading to a control chamber, brake pipe discharge valve means opened responsively to a reduction in equalizing reservoir pressure below brake pipe pressure to effect a withdrawal of fluid under pressure from said brake pipe and supply of such withdrawn fluid to said passageway and control chamber and closed when brake pipe pressure has reduced to substantially the value of equalizing reservoir pressure, flow restricting means interposed between a branch of said passageway and the atmosphere, valve means responsive to supply of fluid under pressure to said control chamber to effect venting of said volume and responsive to release of fluid under pressure from said control chamber via said flow restricting means to establish a restricted connection between said equalizing reservoir and the then vented volume, whereby a limited degree of build-back in equalizing reservoir pressure will be absorbed or dissipated by flow of equalizing reservoir fluid into said volume at the restricted rate controlled by said restricted connection.

8. In a fluid pressure brake apparatus, the combination of a brake pipe, an equalizing reservoir, a volume of substantially smaller capacity than said reservoir, operator-controlled brake valve means for effecting a reduction in equalizing reservoir pressure at a service rate and of a chosen degree and then bottling up fluid in the equalizing reservoir following such chosen degree of reduction, valve means responsive to pressure of fluid in a control chamber to effect venting of said volume and responsive to venting of said control chamber to establish a restricted flow connection between said equalizing reservoir and the then vented volume, brake pipe discharge valve means opened responsively to a reduction in equalizing reservoir pressure below brake pipe pressure for supplying fluid under pressure from the brake pipe to said control chamber and closed for terminating such supply when brake pipe pressure is reduced to substantially the value of equalizing reservoir pressure, means defining a restricted communication via which the pressure of fluid supplied from the brake pipe to the control chamber by said discharge valve means may blow down at a restricted rate, maintaining valve means opened whenever and so long as equalizing reservoir pressure exceeds brake pipe pressure by a predetermined amount for supplying fluid under pressure to the brake pipe to replenish brake pipe pressure against leakage, said restricted flow connection being of such flow capacity as to dissipate equalizing reservoir pressure into said volume at a rate approximating that at which equalizing reservoir pressure tends to build back due to the increase in temperature of equalizing reservoir fluid caused by belated absorption of heat from the ambient air surrounding said reservoir that occurs following closure of said discharge valve means and is caused by the reduction in temperature of equalizing reservoir fluid below that of the ambient air during the reduction in equalizing reservoir pressure, whereby such build-back in equalizing reservoir pressure due to temperature change will be substantially absorbed and nullified for preventing opening of said maintaining valve means unless brake pipe pressure is reduced due to leakage more than said predetermined amount below equalizing reservoir pressure.

9. In a fluid pressure brake apparatus, the combination of a brake pipe, an equalizing reservoir, a volume of substantially smaller capacity than said reservoir, operator-controlled brake valve means for effecting a reduction in equalizing reservoir pressure at a service rate and of a chosen degree and then bottling up fluid in the equalizing reservoir following such chosen degree of reduction, brake pipe discharge valve means opened responsively to a reduction in equalizing reservoir pressure below brake pipe pressure for releasing fluid under pressure from said brake pipe at a restricted rate and closed when brake pipe pressure has been reduced to substantially the value of equalizing reservoir pressure, and means for automatically effecting venting of said volume whenever the brake pipe discharge valve means is opened and for automatically establishing a restricted flow connection between said equalizing reservoir and volume whenever the brake pipe discharge valve means is closed, whereby equalizing reservoir pressure will be dissipated at a restricted rate corresponding to the flow capacity of said flow connection and to an extent corresponding to the capacity of said volume.

References Cited in the file of this patent

UNITED STATES PATENTS 2,846,272    Kirk _____ Aug. 5, 1958